(12) United States Patent
Mang et al.

(10) Patent No.: US 12,438,793 B2
(45) Date of Patent: Oct. 7, 2025

(54) LATENCY DIAGNOSTICS FOR MULTIPARTY SYSTEMS

(71) Applicant: AT&T Intellectual Property I, L.P., Atlanta, GA (US)

(72) Inventors: Xiaowen Mang, Morganville, NJ (US); Carolyn Johnson, Holmdel, NJ (US); Gregory Smith, Shrewsbury, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 15 days.

(21) Appl. No.: 18/306,931

(22) Filed: Apr. 25, 2023

(65) Prior Publication Data

US 2024/0064083 A1    Feb. 22, 2024

Related U.S. Application Data

(62) Division of application No. 17/454,686, filed on Nov. 12, 2021, now Pat. No. 11,671,340.

(51) Int. Cl.
*H04L 43/0864* (2022.01)
*H04L 41/22* (2022.01)
(Continued)

(52) U.S. Cl.
CPC .......... *H04L 43/0864* (2013.01); *H04L 41/22* (2013.01); *H04L 43/067* (2013.01);
(Continued)

(58) Field of Classification Search
CPC ............. H04L 43/0864; H04L 43/0817; H04L 43/0894; H04L 43/16; H04L 43/0829; H04L 41/5067; H04L 43/0852
See application file for complete search history.

(56) References Cited

U.S. PATENT DOCUMENTS 9,942,787 B1 * 4/2018 Tillotson ............... H04W 24/08
10,999,172 B1 * 5/2021 Fuchs .............. H04N 21/25808
(Continued)

OTHER PUBLICATIONS

Office Action mailed Sep. 28, 2022 for U.S. Appl. No. 17/454,686, 28 pages.
(Continued)

*Primary Examiner* — Anh Nguyen
(74) *Attorney, Agent, or Firm* — Guntin & Gust, PLC; Erik Boyd

(57) ABSTRACT

The described technology is generally directed towards latency diagnostics for multiparty systems, such as a system comprising a communication network, a content delivery network (CDN), and one or more internet service providers (ISPs). A latency analyzer component can process latency data in response to a latency diagnostic trigger, such as an alert from a video quality monitoring system. The latency analyzer can determine whether latency is attributable to the communication network. If not, the latency analyzer can determine whether the latency is attributable to the CDN. If the latency is not attributable to the communication network or the CDN, the latency analyzer can determine that the latency is attributable to the ISP, and the latency analyzer can identify the ISP and generate appropriate reports and notifications.

20 Claims, 11 Drawing Sheets

(51) Int. Cl.
*H04L 43/067* (2022.01)
*H04L 43/0817* (2022.01)
*H04L 43/0894* (2022.01)
*H04L 43/16* (2022.01)

(52) U.S. Cl.
CPC ...... *H04L 43/0817* (2013.01); *H04L 43/0894* (2013.01); *H04L 43/16* (2013.01)

(56) References Cited

U.S. PATENT DOCUMENTS

| | | | |
|---|---|---|---|
| 11,184,266 B1* | 11/2021 | Blum | H04L 43/0852 |
| 2019/0037011 A1* | 1/2019 | Kumar | H04L 45/121 |
| 2019/0052532 A1* | 2/2019 | Chen | H04L 41/0895 |
| 2020/0029240 A1* | 1/2020 | Li | H04L 43/08 |
| 2021/0075729 A1 | 3/2021 | Fedorov et al. | |
| 2023/0108310 A1* | 4/2023 | Jiang | H04N 21/24 725/116 |

OTHER PUBLICATIONS

Notice of Allowance mailed Jan. 23, 2023 for U.S. Appl. No. 17/454,686, 29 pages.

* cited by examiner

LATENCY DIAGNOSTICS FOR MULTIPARTY SYSTEMS

RELATED APPLICATION

The subject patent application is a divisional of, and claims priority to, U.S. patent application Ser. No. 17/454,686, filed Nov. 12, 2021, and entitled "LATENCY DIAGNOSTICS FOR MULTIPARTY SYSTEMS," the entirety of which priority application is hereby incorporated by reference herein.

TECHNICAL FIELD

The subject application is related to communication networks, and more particularly, to latency measurement in communication networks that use content distribution networks (CDNs) to deliver data.

BACKGROUND

Content distribution networks (CDNs) deliver content, often video content, for consumption by end users. CDNs typically comprise content servers that are geographically distributed, so that video content can be delivered to end users from a nearby content server with high speed.

CDNs can optionally be provided by network operators, such as AT&T Corporation and others, which also provide other services, namely, communication network services. A CDN provided by a network operator may be referred to as a telco CDN. Alternatively, CDNs can be provided by third party companies, such as the Akamai Corporation and others, which can optionally make simultaneous use of multiple ISP networks, such as the AT&T network, to assist with content delivery.

Maintaining a high level of end user satisfaction is important for all CDN service providers. Slow CDN service can lead to customer dissatisfaction and corresponding loss of business. Furthermore, severe performance degradations can trigger penalties associated with service level agreement (SLA) violations.

End users can connect directly to equipment that is owned or controlled by a network operator. These end users may be referred to as "on-net" users, with respect to the network operator's network. For on-net users of a telco CDN, identifying, investigating and addressing CDN performance degradations can be relatively straightforward. A network operator, as the operator of most of the equipment involved in providing service, can acquire comprehensive information regarding any delay, and the network operator can optionally reconfigure its network as needed to address the issue.

In contrast, "off-net" users can connect to network operator's equipment via intermediate network equipment, such as equipment provided by a third-party internet service provider (ISP). Addressing CDN performance degradations involving off-net users is more complex, because no single entity (such as the network operator) has complete end-to-end and hop-by-hop information about performance degradations experienced by the off-net users.

For example, when an off-net customer of a telco CDN experiences a performance degradation, identifying the root causes of the degradation is complicated due to the fact that the content delivery path comprises services provided by more than one operator. If the off-net customer's local ISP is, for example, a tier 2 ISP, content may travel from the CDN, through the network operator's network, to a tier 1 ISP, then to the tier 2 ISP, before finally reaching the end user. If the end user experiences a service degradation, it is advantageous for the telco CDN to be able to quickly localize the root causes and accept or deny the responsibility for the degradation, with high confidence. In addition, it is advantageous for the telco CDN to determine which of several CDN's may be responsible for service degradation, and more particularly, whether the responsible CDN is the telco CDN or a third-party CDN.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
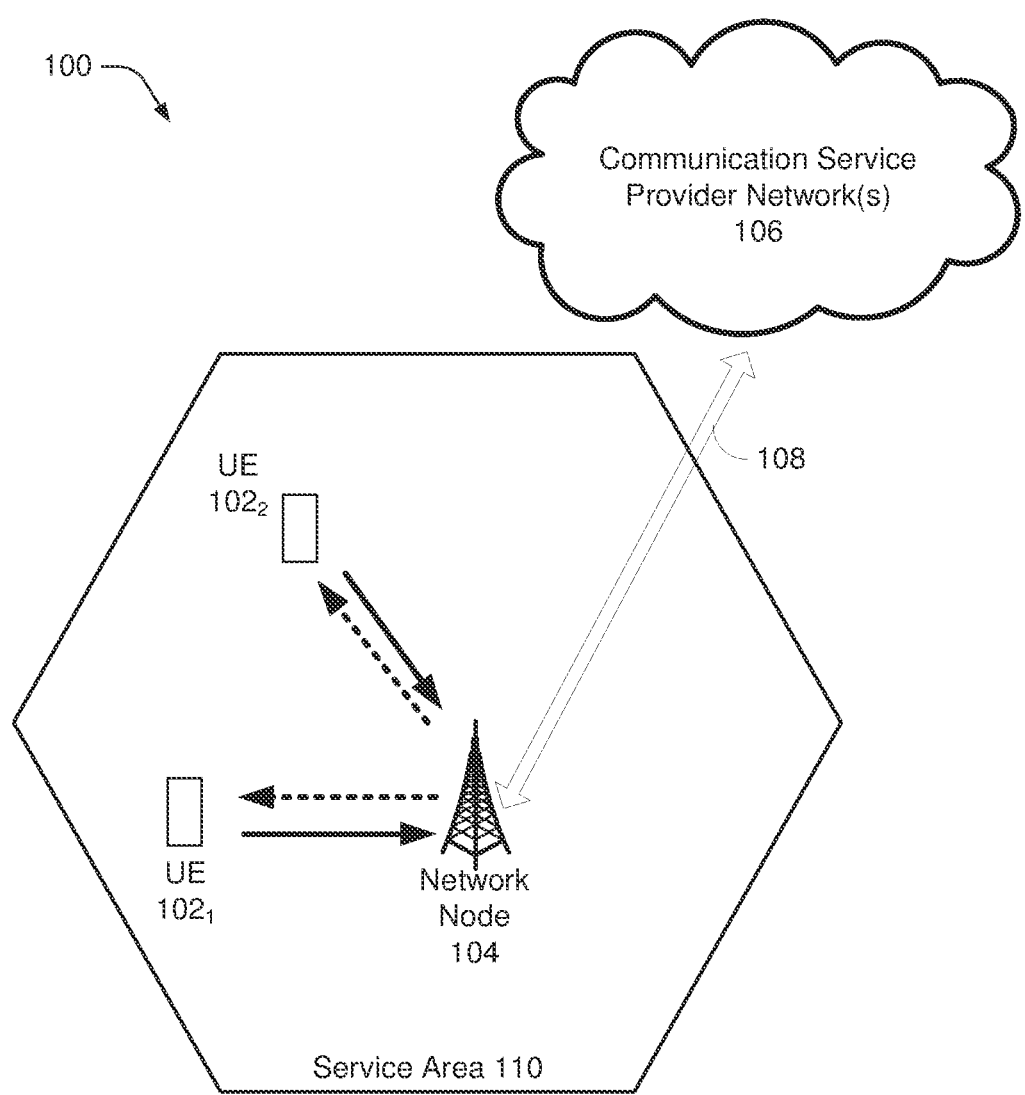
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards latency diagnostics for multiparty systems, such as a system comprising a communication network, a CDN, and one or more ISPs. A latency analyzer component can process latency data in response to a latency diagnostic trigger, such as an alert from a video quality monitoring system. The latency analyzer can determine whether latency is attributable to the communication network. If not, the latency analyzer can determine whether the latency is attributable to the CDN. If the latency is not attributable to the communication network or the CDN, the latency analyzer can determine that the latency is attributable to the ISP, and the latency analyzer can identify the ISP and generate appropriate reports and notifications. Further aspects and embodiments of this disclosure are described in detail below.

In this disclosure, the term "on-net" refers to end users who attach directly to an ISP or telco's access equipment, whether via a wired or wireless connection. End users who attach directly to an ISP or telco's access equipment can be considered on-net with respect to that ISP or telco. All other users can be considered "off-net".

The term "telco CDN" is a reference to CDN ownership. When an ISP or telco owns its own CDN, the CDN is referred to herein as a telco CDN. Typically, although not necessarily, the CDN equipment is attached to core and/or edge equipment owned by the ISP or telco.

The term "third-party CDN" refers to any non-telco CDN whose traffic traverses an ISP or telco network. Third-party CDNs may or may not operate equipment attached to a telco CDN's network. For example, a third-party CDN may have an agreement to operate CDN caches that are directly connected to telco network equipment. Some major CDNs have paid peering arrangements and can also use public peering to reach ISP or telco customers.

The term "telco CDN customer" refers to a customer that receives CDN traffic carried by a telco CDN. Many content owners and publishers use multiple CDNs for capacity, resiliency, performance, and business reasons.

Telco CDNs have differing abilities to obtain key performance indicator (KPI) data, depending on the relationship with the telco CDN customer. When a telco CDN owns a customer, it is relatively easy for the telco CDN to obtain end user client telemetry reports in the form of KPIs. This is an effective approach to understand the performance that end users are experiencing, because customer or end user equipment can generate the data. But if the telco CDN does not own the customer, but rather has a traditional client/supplier relationship, it may be impossible for the telco CDN to obtain proprietary KPI data from the customer.

As long as the end user is being served by a stream or download originating on telco CDN equipment, cache server access logs can be used to find useful performance data. But for streams or downloads originating at third-party CDNs, such logs may not be available.

If the end user is receiving content from a customer that is not served by a telco CDN, then it is harder to obtain useful performance information, since the only available data may be more generic network data such as information regarding packets passing through network equipment. Especially given encryption, it can be difficult to understand the source of the data and what type of data it is. Internet Protocol (IP) and port (e.g., the 5-tuple) information can still be used, but such information includes less useful information.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 4G, 5G, or other next generation networks, the disclosed aspects are not limited to a 4G or 5G implementation, and/or other network next generation implementations, as the techniques can also be applied, for example, in wired cable and broadband networks, or in third generation (3G), or other wireless systems. In this regard, aspects or features of the disclosed embodiments can be exploited in substantially any wired or wireless communication technology.

FIG. 1 illustrates a non-limiting example of a wireless communication system 100 which can be used in connection with at least some embodiments of the subject disclosure. The example wireless communication system 100 provides example network equipment and technologies, with the understanding that embodiments can alternatively or additionally make use of wired network technologies. In one or more embodiments, system 100 can comprise one or more user equipment UEs $102_1$, $102_2$, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop multiple input multiple output (MIMO) mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, depending on the configuration and type of antenna. In example embodiments, UEs 102 can send and/or receive communication data via a wireless link to the network node 104. The dashed arrow lines from the network node 104 to the UEs 102 represent downlink (DL) communications to the UEs 102. The solid arrow lines from the UEs 102 to the network node 104 represent uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or comprise a large scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
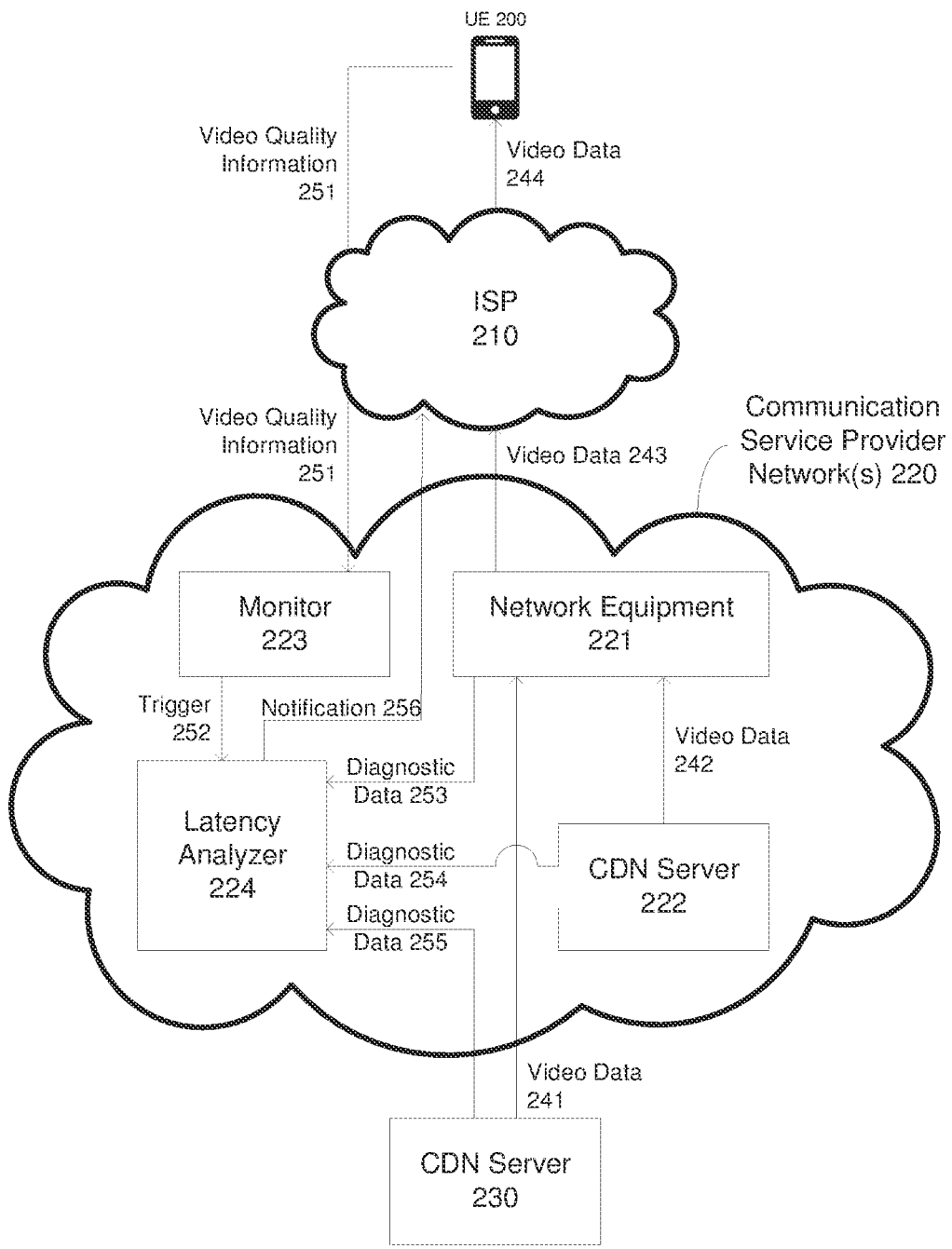
FIG. 2 illustrates an example communication service provider network comprising a latency analyzer, in accordance with various aspects and embodiments of the subject disclosure.

FIG. 2 illustrates an example communication service provider network comprising a latency analyzer, in accordance with various aspects and embodiments of the subject disclosure. FIG. 2 includes a UE 200, an ISP 210, communication service provider network(s) 220, and a CDN server 230. The communication service provider network(s) 220 include network equipment 221, a CDN server 222, a monitor 223, and a latency analyzer 224.

In FIG. 2, the UE 200 can implement a UE 102 introduced in FIG. 1, and the communication service provider network(s) 220 can implement the communication service provider network(s) 106 introduced in FIG. 1. Unlike FIG. 1, FIG. 2 illustrates the ISP 210 situated between the UE 200 and the communication service provider network(s) 220. The communication service provider network(s) 220 can communicate with the UE 200 via the ISP 210.

Example operations according to FIG. 2 can include delivery of video data from one or more of the CDN servers 222, 230 to the UE 200. The CDN server 222 represents a CDN server provided by the network operator (the operator of the communication service provider network(s) 220), and the CDN server 230 represents a CDN server provided by a third-party company. The CDN server 222 can provide video data 242 for consumption by the UE 200, and the CDN server 230 can provide video data 241 for consumption by the UE 200.

Regardless of whether video data originates at CDN server 222 or CDN server 230, the video data 241 or 242 can be processed by network equipment 221 and delivered as video data 243 to ISP 210. The network equipment 221 generally represents network equipment of the communication service provider network(s) 220, and can include, e.g., any of the equipment described in connection with communication service provider network(s) 106. The video data 243 can be processed by ISP 210 and delivered as video data 244 to UE 200.

The various illustrated segments of video data transport, including video data 241, video data 242, video data 243, and video data 244, can comprise different latencies. For example, video data 241 or 242 may be transported with very low latency, while video data 243 may be transported with medium latency, and video data 244 may be transported with large latency. Alternatively, video data 244 may be subject to very low latency while video data 241 or 242 may be subject to large latency. In some cases, video data 241-244 may all be subject to low, medium, or high latency. In general, any amounts of latency can be present at any of the illustrated stages of video data delivery.

Diagnostic data 253, 254, and 256 can be reported to latency analyzer 224. Diagnostic data 253 can comprise, e.g., data from network equipment 221, which can include latency information or other information from which latency information can be derived. Diagnostic data 253 can be used to derive latency values associated with the transport of video data 243. Diagnostic data 254 can comprise, e.g., data from CDN server 222, which can likewise include latency information or other information from which latency information can be derived. Diagnostic data 254 can be used to derive latency values associated with the transport of video data 242. Similarly, diagnostic data 255 can comprise, e.g., data from CDN server 230, which can include latency information or other information from which latency information can be derived. Diagnostic data 255 can be used to derive latency values associated with the transport of video data 241. However, it is noted that diagnostic data 255 may or may not be shared with latency analyzer 224. For example, if sharing of diagnostic data 255 is required by legal contract, diagnostic data 255 will be shared. If sharing of diagnostic data 255 is not required, it generally will not be shared.

In some embodiments, diagnostic data 253, 254, and 256 can be delivered, e.g., to a database accessible by latency analyzer 224, on a substantially continuous basis regardless of whether a service degradation has been reported. In other embodiments, latency analyzer 224 can be configured to retrieve diagnostic data 253, 254, and 256 in response to a service degradation, as described further below.

In some embodiments, monitor 223 can be configured to monitor for potential service degradation, such as high latency in the video data 244 delivered to UE 200. For example, monitor 223 can be configured to receive video quality information 251 from the UE 200. Video quality information 251 can optionally be delivered to monitor 223 via ISP 210 and communication service provider network(s) 220, as illustrated in FIG. 2. Video quality information 251 can comprise, e.g., information representative of a quality of video data 244 which can be reported automatically by UE 200.

In another example, monitor 223 can be configured to receive customer reported service degradation information. A customer service center can include a ticketing system that creates tickets representing customer reported issues, and ticket information can be reported to monitor 223. In a further example, monitor 223 can be configured to monitor subsystems such as the network equipment 221, CDN server 222 and/or CDN server 230, and monitor 223 can identify circumstances in which high latency of, e.g., video data 241, 242, or 243 is probable based on the conditions at the monitored subsystems.

In response to identifying a potential service degradation, monitor 223 can provide a latency diagnostic trigger 252 to the latency analyzer 224. In response to the latency diagnostic trigger 252, the latency analyzer 224 can be configured to process the diagnostic data 253, 254, and/or 255 in order to investigate and report on the extent of the latency observed at the various subsystems. For example, the latency analyzer 224 can be configured to determine an amount of latency associated with network equipment 221, an amount of latency associated with a CDN server 222 or 230, and an amount of latency associated with ISP 210.

In some embodiments, the latency analyzer 224 can be configured, e.g., to first investigate latency associated with network equipment 221. If network equipment 221 is determined to be a source of latency that exceeds a threshold, then the latency analyzer 224 can terminate investigation and optionally report the network equipment 221 as at least one party responsible for degraded service.

However, if the latency analyzer 224 determines that network equipment 221 is not a source of latency that exceeds the threshold, then the latency analyzer 224 can investigate latency associated with a CDN server 222 or 230. If a CDN server 222 or 230 is determined to be a source of latency that exceeds the threshold, then the latency analyzer 224 can terminate investigation and optionally report the CDN server 222 or 230 as at least one party responsible for degraded service.

Finally, if the latency analyzer 224 determines that the CDN server 222 or 230 is not a source of latency that exceeds the threshold, then the latency analyzer 224 can optionally conclude that the ISP 210 is the source of latency, and the latency analyzer 224 can terminate investigation and optionally report the ISP 210 as at least one party responsible for degraded service.

Proceeding in the stepwise approach as described above allows the latency analyzer 224 to identify ISP 210 as at least one party responsible for degraded service by process of elimination, namely, by first verifying that network equipment 221 and CDN servers 222, 230 are not responsible for the service degradation. Such an approach is useful because latency analyzer 224 may have access to diagnostic data 253, 254, 255 pertaining to network equipment 221 and CDN servers 222, 230, while similar diagnostic data pertaining to ISP may not be available.

Latency analyzer 224 can be configured to report determinations regarding which subsystem (221, 222/230, and/or 210) is responsible for latency. In general, latency analyzer 224 can store or report information in many different ways and latency analyzer 224 can communicate such information to any desired recipient, as will be appreciated. FIG. 2 illustrates reporting an example notification 256 to ISP 210. In an embodiment, the notification 256 can optionally summarize the different sources of latency associated with a degraded service event. For example, the notification 256 can optionally indicate an extent of latency attributed to ISP 210 and/or network equipment 221 and CDN servers 222, 230. Notification 256 may or may not include detailed latency information. In general, unless required by law, ISPs do not disclose detailed performance information. Therefore, in some embodiments, notification 256 can identify a party that is responsible for a latency or service degradation, without including a summary of the different sources of latency.

Figure 3:
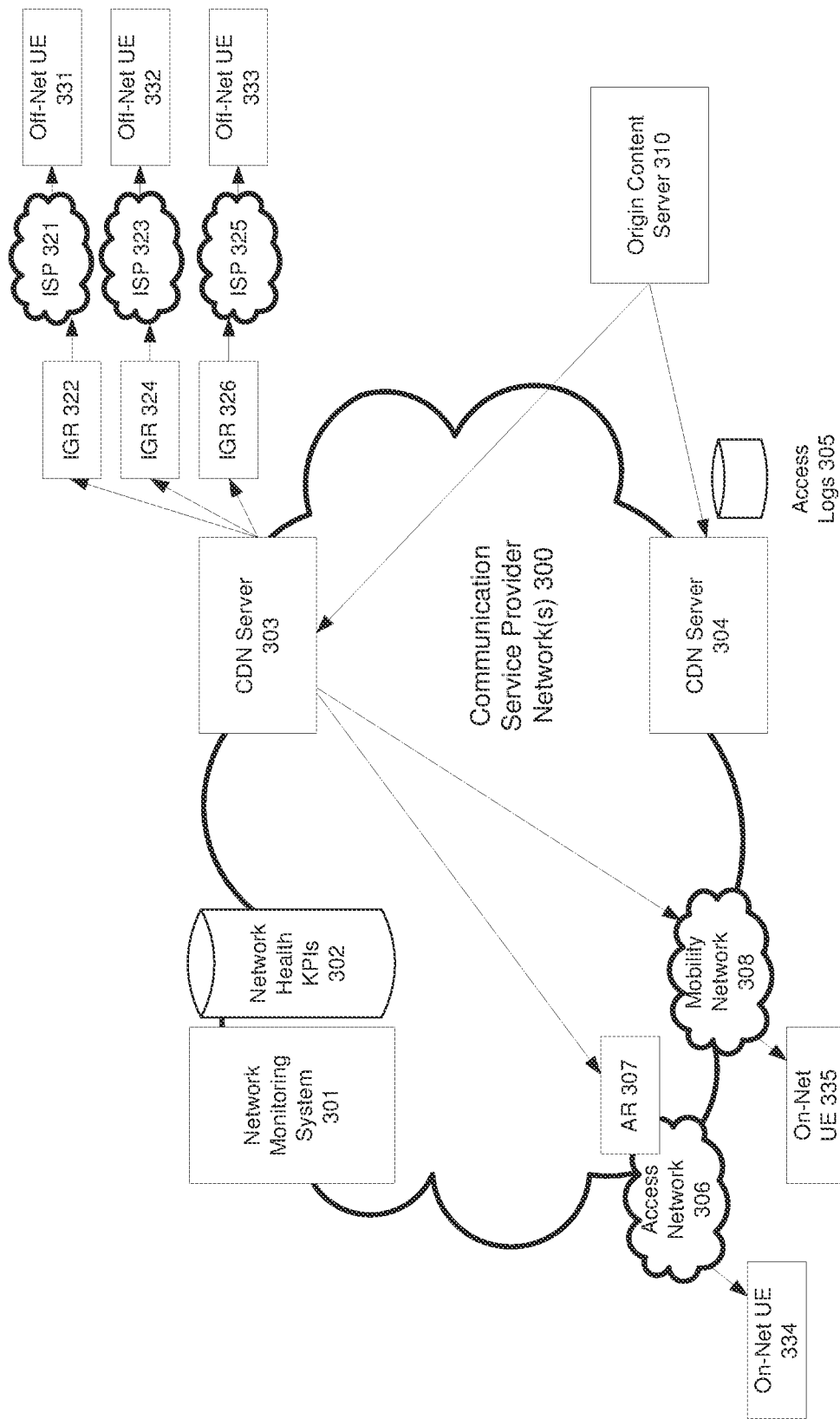
FIG. 3 illustrates an example network architecture comprising a CDN, a communication service provider network, on-net UEs, and off-net UEs, in accordance with various aspects and embodiments of the subject disclosure.

FIG. 3 illustrates an example network architecture comprising a CDN, a communication service provider network, on-net UEs, and off-net UEs, in accordance with various aspects and embodiments of the subject disclosure. FIG. 3 includes communication service provider network(s) 300, origin content server 310, ISPs 321, 323, and 325, internet gateway routers (IGRs) 322, 324, and 326, off-net UEs 331, 332 and 333, and on-net UEs 334 and 335.

The communication service provider network(s) 300 include network monitoring system 301 and network health key performance indicators (KPIs) 302. The communication service provider network(s) 300 further include CDN server 303, CDN server 304, and access logs 305. The communication service provider network(s) 300 further include or connect to an access network 306 and a mobility network 308, wherein the access router (AR) 307 can be used to connect to the access network 306.

In FIG. 3, the communication service provider network(s) 300 can implement the communication service provider network(s) 220 introduced in FIG. 2. Similarly, the off-net UEs 331, 332, 333 can implement the UE 200 introduced in FIG. 2, and the ISPs 321, 323, and 325 can implement the UE 210 introduced in FIG. 2. The CDN servers 303, 304 and access logs 305 can implement, e.g., different peering locations that provide a CDN server 222 introduced in FIG. 2. The on-net UEs 334, 335 can implement UEs 102 introduced in FIG. 1. Finally, the network monitoring system 301 can comprise a monitor 223 and latency analyzer 224 introduced in FIG. 2.

Example operations illustrated in FIG. 3 can include delivery of video data from origin content server 310 to CDN servers 303, 304, and delivery of the video data from CDN servers 303, 304 to off-net UEs 331, 332, 333 via IGRs 322, 324, 326, and ISPs 321, 323, 325. The video data can also be delivered from CDN servers 303, 304 to on-net UEs 334, 335 via access network 306 and mobility network 308.

FIG. 3 illustrates a high-level CDN network architecture in which customers associated with UEs 331, 332, 333, 334, 345 can watch videos streamed from CDN servers 303, 304 hosted by their CDN service provider. It also shows off-net customer access to telco CDN servers 303, 304 via ISPs 321, 323, 325 and communication service provider network(s) 300 peering points while on-net customers stay within the telco CDD network.

In some embodiments, methods can use available latency measurements as diagnostic triggers for off-net services. Latency is a critical performance metric. Excessive latency is directly related to poor customer experiences. Root causes for excessive latency can vary from poor design at the network and service level, to inadequate capacity planning for growth or failures in the communication service provider network(s) 300 or at CDN servers 303, 304.

Furthermore, latency measurements are widely available at both network and application layers. ISPs 321, 323, 325 generally track their network level latencies across access points to fulfil their own SLAs. CDN service providers log time to deliver content out of their cache servers to satisfy their customers, while optimizing their cache server placements and managing their caching capacity. Methods according to this disclosure can take advantage of massive available data and machine learning (ML) technologies to efficiently determine a cause for a latency issue is as well as which provider is responsible for any degraded customer experiences.

Figure 4:
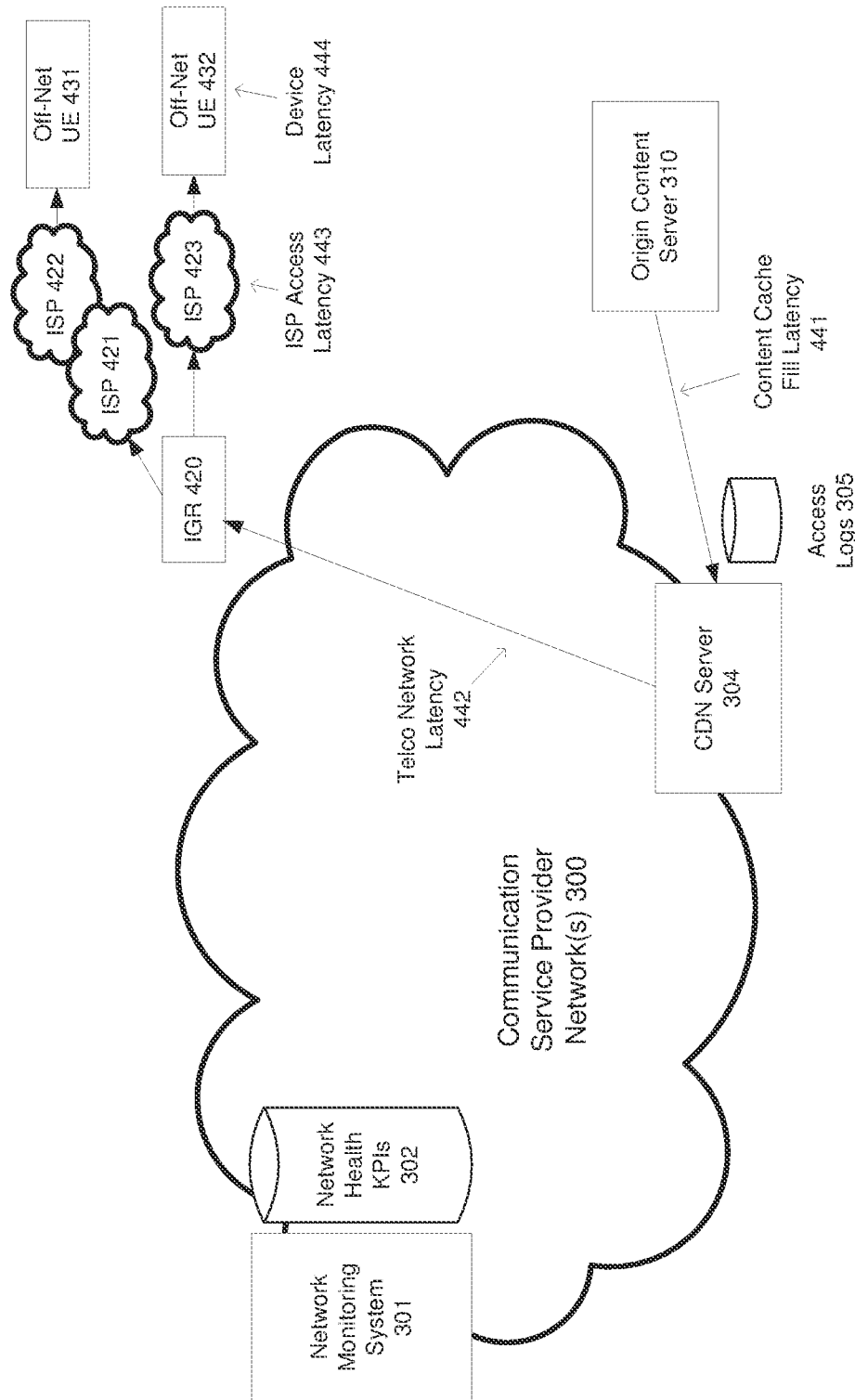
FIG. 4 illustrates example segments of end-to-end latency experienced by off-net customers, in accordance with various aspects and embodiments of the subject disclosure.

FIG. 4 illustrates example segments of end-to-end latency experienced by off-net customers, in accordance with various aspects and embodiments of the subject disclosure. FIG. 4 includes the communication service provider network(s) 300 and origin content server 310 introduced in FIG. 3. FIG. 4 also includes the network monitoring system 301 and network health KPIs 302 introduced in FIG. 3. FIG. 4 also includes the CDN server 304 and access logs 305 introduced in FIG. 3. FIG. 4 also includes ISPs 421, 422, and 423, IGR 420, and off-net UEs 431 and 432.

In FIG. 4, the off-net UEs 431 and 432 can implement off-net UEs such as 331, 332, 333 introduced in FIG. 3, and the IGR 420 can implement an IGR such as IGR 321, 323, 325 introduced in FIG. 3. In FIG. 4, the ISP 421 can comprise a tier 1 ISP, while the ISP 422 can provide a tier 2 ISP. The UE 431 can connect to the ISP 422, which can connect to the ISP 421, which can in turn connect to the communication service provider network(s) 300 via IGR 420.

Example operations illustrated in FIG. 4 can include delivery of video data from origin content server 310 to CDN server 304, delivery of the video data from CDN server 304 to IGR 420, and delivery of the video data from IGR 420 to UEs 431, 432 via ISPs 421, 422, 423. The delivery of video data from origin content server 310 to CDN server 304 can be associated with a content cache fill latency 441. The delivery of the video data from CDN server 304 to IGR 420 can comprise a telco network latency 442. The delivery of the video data from IGR 420 to UEs 431, 432 via ISPs 421, 422, 423 can comprise ISP access latency 443. Furthermore, the UEs 431, 432 can comprise device latency 444.

FIG. 4 illustrates how the end-to-end latency for content delivery can be partitioned into different segments. Most of the time, device latency 444 remains static unless a UE is misconfigured. ISP access latency 443 is the latency experienced between off-net UEs 431, 432 and CDN server peering points within the communication service provider network(s) 300. ISP access latency 443 may be divided further into two or more segments depending on whether a UEs local ISP is tier 1 or tier 2. If tier 2, as in the case of ISP 422, then traffic is routed via another tier1 ISP 421 before connecting to the telco CDN peering point.

Within a telco CDN, two types of latencies can be defined network latency 442 and CDN content cache fill latency 441. Network latency 442 captures the delay between a peering point (e.g., at or near IGR 420) and a content cache server implemented by CDN server 304. Content cache fill latency 441 measures time spent by a CDN server 304 processing a UE 431, 432 request for content. Besides CDN server 304 processing time, content cache fill latency 441 can also comprise time spent accessing the origin content server 310, which can depend on CDN server 304 location.

By design, end-to-end latency of all of the latency segments 441, 442, 443, 444 for video content delivery can be kept under a predefined target latency. When end-to-end latency exceeds the target, customer viewing experience can be negatively impacted. For example, there may be pauses or gaps in a video view at UE 431 or 432. Diagnostic data comprising latency information applicable to at least latency segments 441 and 442, or information from which latency can be derived, can be reported to network monitoring system 301 and optionally stored in network health KPIs 302.

Figure 5:
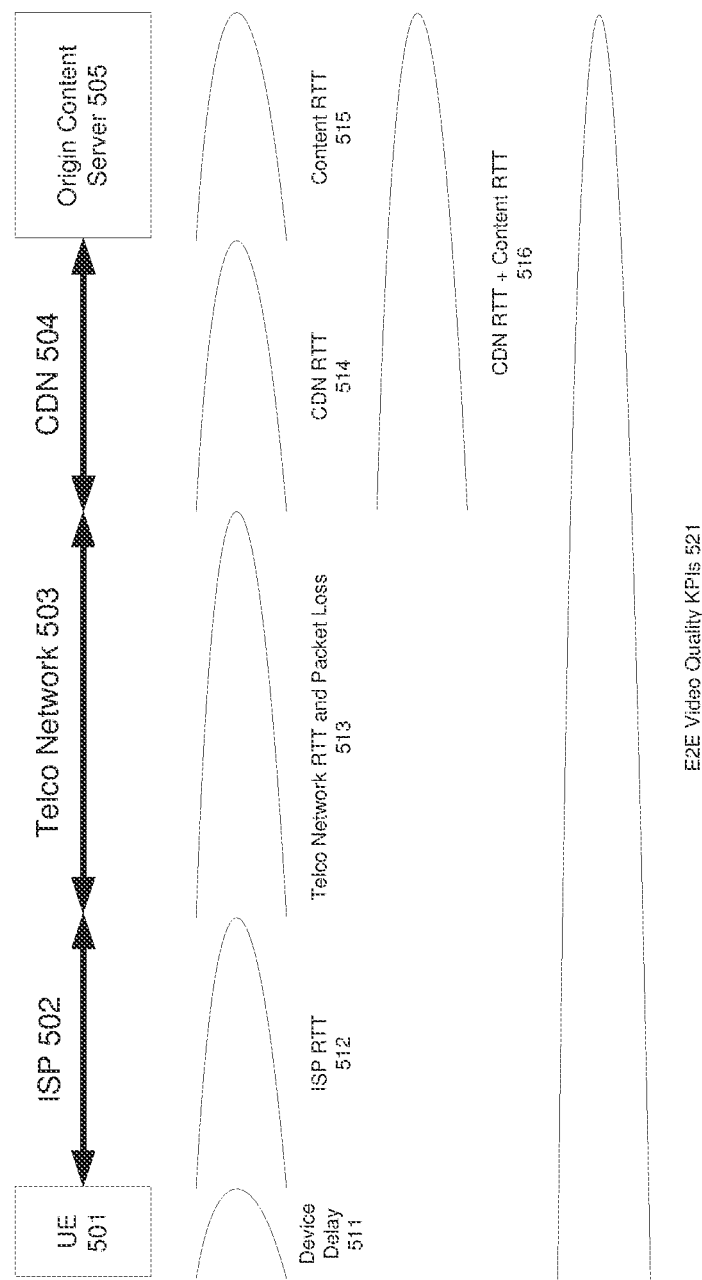
FIG. 5 provides another view of the example segments of end-to-end latency introduced in FIG. 4, in accordance with various aspects and embodiments of the subject disclosure.

FIG. 5 provides another view of the example segments of end-to-end latency introduced in FIG. 4, in accordance with various aspects and embodiments of the subject disclosure. FIG. 5 illustrates a UE 501 and an origin content server 505. The UE 501 can implement, e.g., a UE 431 or 432 such as illustrated in FIG. 4. The origin content server 505 can implement, e.g., an origin content server 310 such as illustrated in FIG. 3 and FIG. 4. A communication path between the UE 501 and the origin content server 505 can comprise an ISP 502, a telco network 503, and a CDN 504. ISP 502, telco network 503, and CDN 504 correspond to, e.g., the ISP 423, communication service provider network(s) 300, and CDN server 304/origin content server 310, illustrated in FIG. 4.

FIG. 5 illustrates a device delay 511 associated with the UE 501, an ISP round trip time (RTT) 512 associated with ISP 502, a telco network RTT and packet loss 513 associated with telco network 503, a CDN RTT 514 associated with CDN 504, and a content RTT 515 associated with origin content server 505. The CDN RTT 514 and content RTT 515 can be combined into CDN RTT+content RTT 516. An aggregation of 511, 512, 513, 514, and 515 can be represented as end to end (E2E) video quality KPIs 521.

In an aspect, FIG. 5 characterizes the accessibility of available latency measurements. Telco CDN providers may not own video quality measurement and reporting platforms. Instead, video quality monitoring platforms may be managed by origin content providers. However, telco CDN operators can be allowed to access video quality KPIs.

Telco CDN providers also may not have access to latency information pertaining to ISP 502. When an excessive latency, caused by ISP 502 or otherwise, causes performance degradation, the telco network 503 and/or CDN 504 can use the techniques described herein to quickly determine where the performance degradation root cause resides, whether within telco network 503 and/or CDN 504, in customer's ISP 502.

Figure 6:
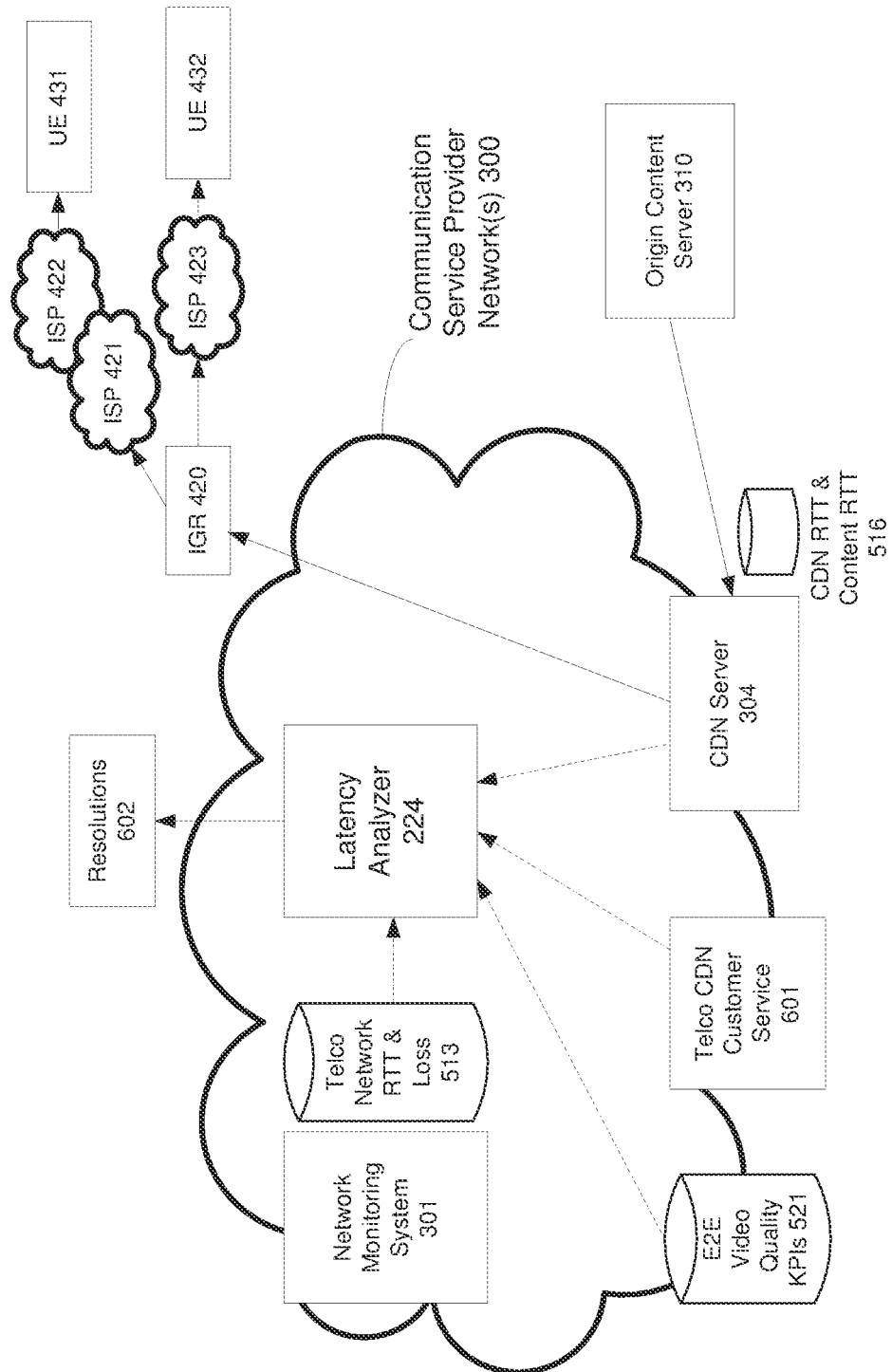
FIG. 6 illustrates example collection of diagnostic data by a latency analyzer, in accordance with various aspects and embodiments of the subject disclosure.

FIG. 6 illustrates example collection of diagnostic data by a latency analyzer, in accordance with various aspects and embodiments of the subject disclosure. FIG. 6 includes the communication service provider network(s) 300 and origin content server 310 introduced in FIG. 3. FIG. 6 also includes the off-net UEs 431 and 432, ISPs 421, 422, 423, and IGR 420 introduced in FIG. 4.

Furthermore, FIG. 6 includes the network monitoring system 301 introduced in FIG. 3. In FIG. 6, the network health KPIs 302 introduced in FIG. 3 are updated to include telco network RTT and loss 513, such as described in connection with FIG. 5. FIG. 6 includes the CDN server 304 introduced in FIG. 3, and the access logs 305 from FIG. 3 are updated to include CDN RTT and content RTT 516 such as described in connection with FIG. 5.

FIG. 6 furthermore comprises the E2E video quality KPIs 521 introduced in FIG. 5, and the latency analyzer 224 introduced in FIG. 2. Finally, FIG. 6 illustrates telco CDN customer service 601 and resolutions 602. Example operations illustrated in FIG. 6 can include, in addition to operations described in connection with FIG. 4, the providing/retrieval of diagnostic data from telco network RTT and loss 513, E2E video quality KPIs 521, telco CDN customer service 601, and CDN server 304 to latency analyzer 224, and the output of resolutions 602 by latency analyzer 224.

FIG. 6 illustrates example data feeds to latency analyzer 224. In some embodiments, the data feeds can include one or more of automatically generated notifications from E2E video quality KPIs 521, trouble tickets initiated from telco CDN customer service 601, measurements from network monitoring system 301's data 513, and latency measurements from CDN server 304's data 524.

Figure 7:
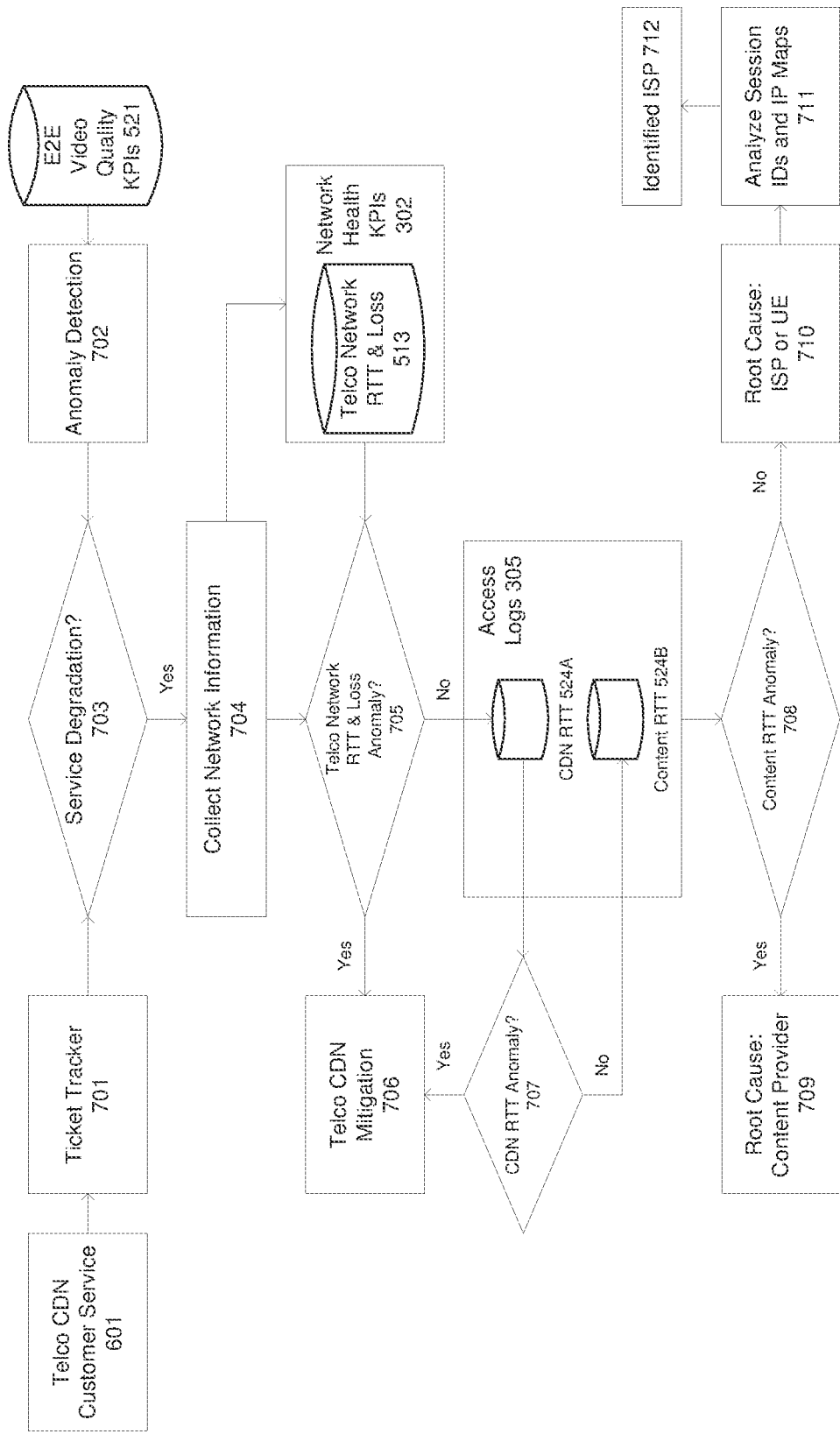
FIG. 7 illustrates an example workflow of a latency analyzer, in accordance with various aspects and embodiments of the subject disclosure.

FIG. 7 illustrates an example workflow of a latency analyzer, in accordance with various aspects and embodiments of the subject disclosure. The illustrated example workflow can implement operations of latency analyzer 224, illustrated in FIG. 2 and FIG. 6. The workflow comprises some elements introduced previously in connection with FIGS. 1-6, and like elements are assigned like identifiers.

The workflow can be triggered at decision 703 by notifications from ticket tracker 701, based on input from telco CDN customer service 601, or from anomaly detection 702, e.g., a video quality monitoring system which can analyze inputs from E2E video quality KPIs 521. For example, when a dissatisfied customer reports a service degradation, a trouble ticket can be created and escalated to decision 703, and the illustrated workflow can initiate the troubleshooting process. Alternatively, if anomaly detection 702 is automated at a video quality monitoring platform, an auto-generated alert can also invoke the illustrated workflow.

After the workflow is triggered at decision 703, network information associated with impacted customers can be collected at 704, e.g., time, location as well as session IDs and IP addresses can be collected. Operation 704 can query network monitoring systems, e.g., network health KPIs 302 comprising telco network RTT and loss 513, to obtain latency and loss statistics associated with a reported time window of the service degradation.

At decision 705, if telco network RTT and loss 513 exhibits a latency or loss that exceeds a threshold, then telco CDN mitigation 706 can be activated to carry out further investigation or mitigation. Otherwise, the workflow can proceed to examine content server access logs 305 to determine, e.g., cache server processing time(s) stored in CDN RTT 524A. If processing time(s) in CDN RTT 524A exceed a threshold value such that there is a CDN RTT anomaly 707, then telco CDN mitigation 706 can be activated to assess the situation at an identified CDN server.

If no anomaly is present at 707, the latency analyzer can check content RTT 524B to assess overall content cache fill latency. At 708, the latency analyzer can determine whether there is a content RTT anomaly. If so, then at 709 the latency analyzer can determine that the root cause of the service degradation is the content provider and the problem is rooted from origin content servers. For example, abnormal increases of content cache fill latency may be due to issues from content providers.

If it is determined at 708 that there is no content RTT anomaly, then the performance degradation is not caused by the telco CDN provider nor content provider, and so at 710 the latency analyzer can conclude that the root cause of the degradation is either the customer's access ISPs or UE. At 711, by correlating impacted session IDs and IP addresses with publicly available IP locator tools, the latency analyzer can identify, at 712, which access ISPs serve impacted customers. A prompt communication can optionally be sent to identified ISPs, if desired.

Figure 8:
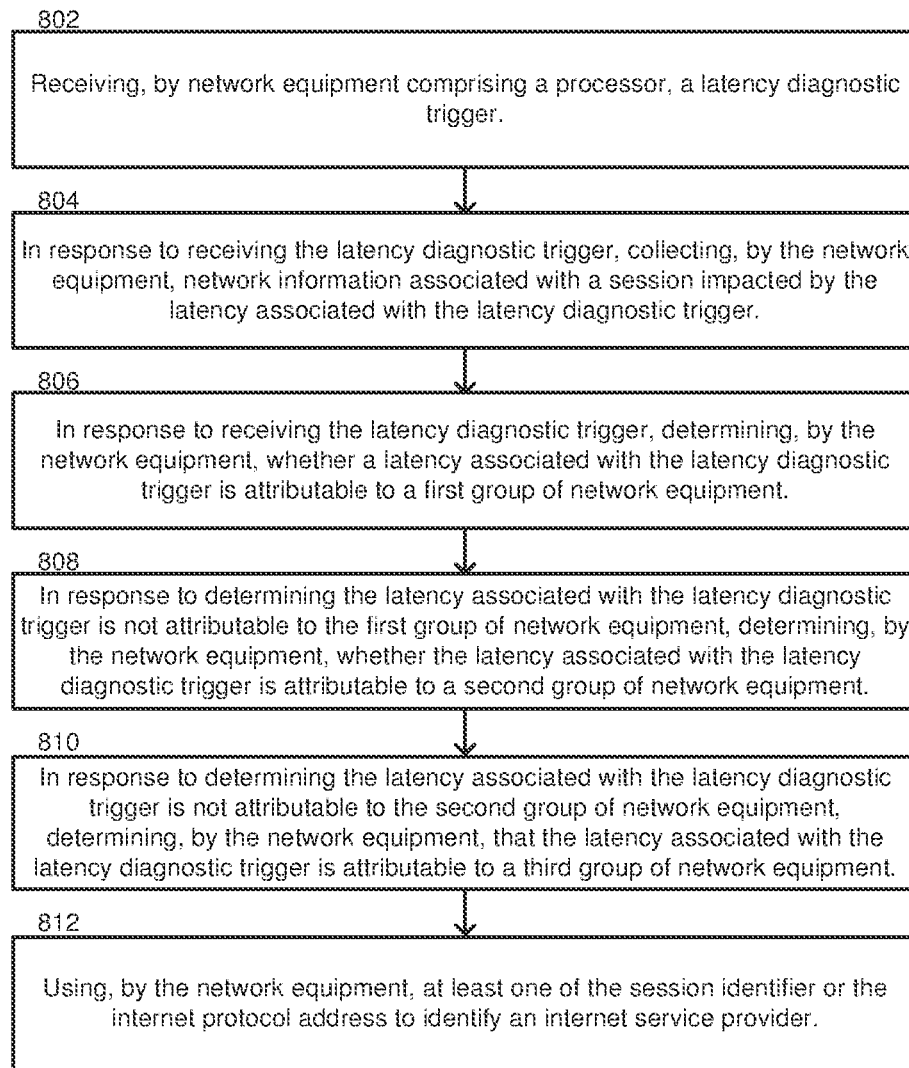
FIG. 8 is a flow diagram representing example operations of network equipment comprising a latency analyzer, in accordance with various aspects and embodiments of the subject disclosure.

FIG. 8 is a flow diagram representing example operations of network equipment comprising a latency analyzer, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by network equipment a latency analyzer 224 such as illustrated in FIG. 2. Example operation 802 comprises receiving, by network equipment comprising a processor, a latency diagnostic trigger. Receiving the latency diagnostic trigger can comprise, e.g., receiving a notification from a ticketing system or receiving an alert from a video quality monitoring system, as described in connection with FIG. 7.

Example operation 804 comprises, in response to receiving the latency diagnostic trigger, collecting, by the network equipment, network information associated with a session impacted by the latency associated with the latency diagnostic trigger. For example, network information can be collected as described in connection with operation 704 in FIG. 7. The network information can comprise, e.g., time information, location information, a session identifier, and/or an internet protocol address.

Example operation 806 comprises, in response to receiving the latency diagnostic trigger, determining, by the network equipment, whether a latency associated with the latency diagnostic trigger is attributable to a first group of network equipment. For example, operation 806 can determine whether the latency is associated with the network equipment 221 illustrated in FIG. 2, that is, whether the latency is associated with equipment of a communication network 220 comprising the same network equipment as the equipment that hosts the latency analyzer 224. In order to determine whether the latency is attributable to the first group of network equipment, the latency analyzer 224 can query network monitoring system 301 to obtain latency and loss statistics 513 associated with a time window comprising the latency associated with the latency diagnostic trigger.

Example operation 808 comprises, in response to determining the latency associated with the latency diagnostic trigger is not attributable to the first group of network equipment, determining, by the network equipment, whether the latency associated with the latency diagnostic trigger is attributable to a second group of network equipment. The second group of network equipment can comprise, for example, equipment of a content delivery network such as a CDN server 304. In some embodiments, the second group of network equipment can comprises first content delivery network equipment, such as CDN server 304, and second content delivery network equipment, such as origin content server 310, and the determining whether the latency is attributable to the second group of network equipment can comprises determining whether the latency associated with the latency diagnostic trigger is attributable to the first content delivery network equipment (CDN server 304) or the second content delivery network equipment (origin content server 310).

Determining whether the latency is attributable to the second group of network equipment can comprise querying a content server access log 305 to determine a cache server processing time. For example, the determining whether the latency is attributable to the second group of network equipment can comprise detecting an increase of a content server cache fill latency.

Example operation 810 comprises, in response to determining the latency associated with the latency diagnostic trigger is not attributable to the second group of network equipment, determining, by the network equipment, that the latency associated with the latency diagnostic trigger is attributable to a third group of network equipment. The third group of network equipment can comprise, for example, equipment of an ISP 210, wherein the equipment of the ISP does not comprise the network equipment that hosts the latency analyzer 224.

Example operation 812 comprises using, by the network equipment, at least one of a session identifier or an internet protocol address, such as identified at operation 804, to identify an internet service provider. When the third group of network equipment comprises equipment of an ISP, the ISP can be identified at operation 812 for purposes of reporting results and/or notifying the ISP.

Figure 9:
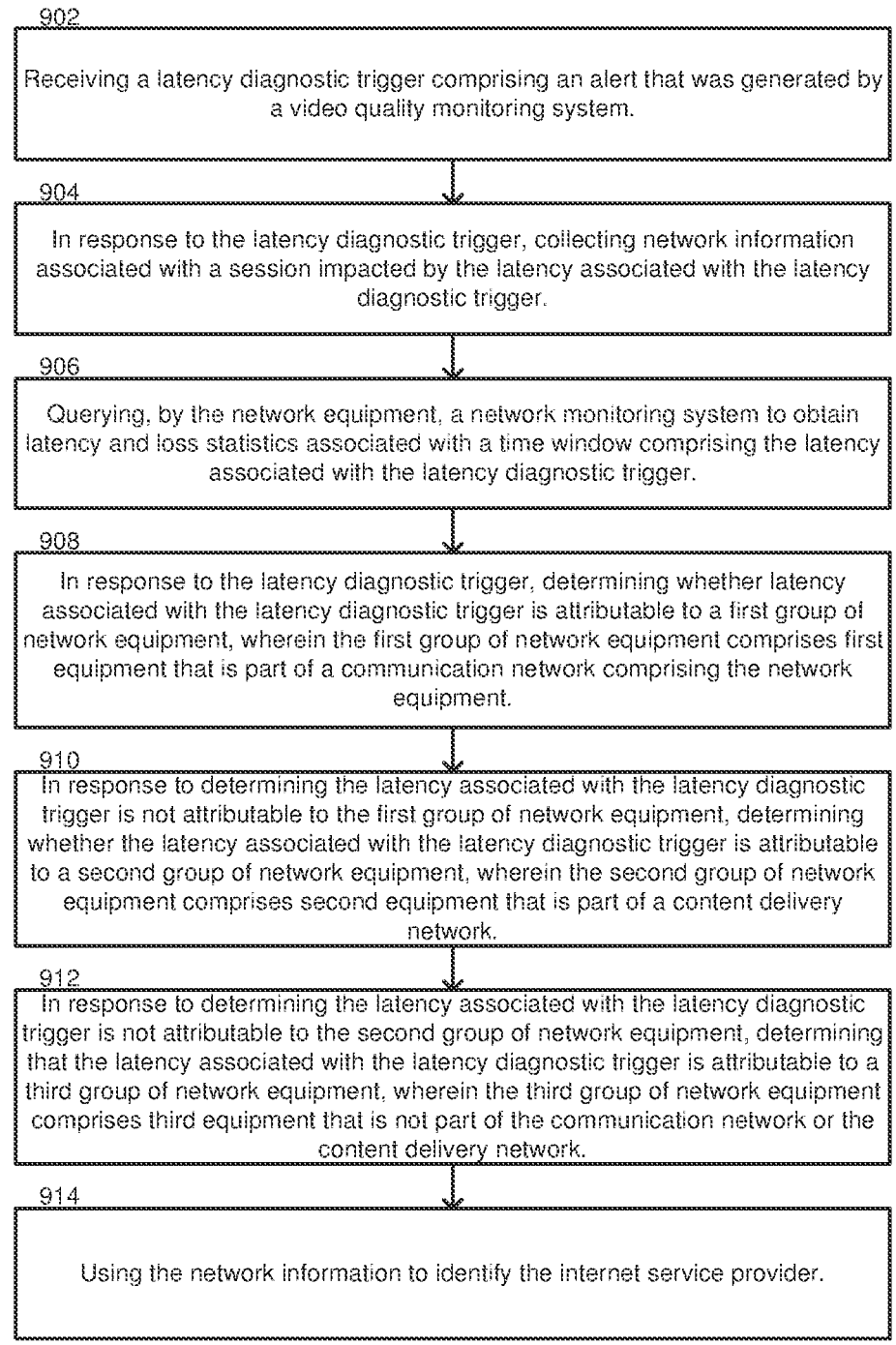
FIG. 9 is a flow diagram representing another group of example operations of network equipment comprising a latency analyzer, in accordance with various aspects and embodiments of the subject disclosure.

FIG. 9 is a flow diagram representing another group of example operations of network equipment comprising a latency analyzer, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by network equipment comprising a latency analyzer 224 such as illustrated in FIG. 2. Example operation 902 comprises receiving a latency diagnostic trigger comprising an alert that was generated by a video quality monitoring system. For example, the latency analyzer 224 can receive an alert from anomaly detection 702 as illustrated in FIG. 7.

Example operation 904 comprises, in response to the latency diagnostic trigger, collecting network information associated with a session impacted by the latency associated with the latency diagnostic trigger. For example, the latency analyzer 224 can collect network information 704 which can include information about a session with a particular UE, such as UE 200.

Example operation 906 comprises, querying, by the network equipment, a network monitoring system to obtain latency and loss statistics associated with a time window comprising the latency associated with the latency diagnostic trigger. For example, the latency analyzer 224 can query network monitoring system 301 to obtain telco network RTT and loss information 513 associated with the latency event under consideration.

Example operation 908 comprises, in response to the latency diagnostic trigger, determining whether latency associated with the latency diagnostic trigger is attributable to a first group of network equipment, wherein the first group of network equipment comprises first equipment, e.g., network equipment 221 that is part of a communication network 220 comprising the network equipment that hosts the latency analyzer 224.

Example operation 910 comprises, in response to determining the latency associated with the latency diagnostic trigger is not attributable to the first group of network equipment, determining whether the latency associated with the latency diagnostic trigger is attributable to a second group of network equipment, wherein the second group of network equipment comprises second equipment that is part of a content delivery network. For example, the latency analyzer 224 can determine whether the latency is attributable to CDN server 222 or CDN server 230.

Example operation 912 comprises, in response to determining the latency associated with the latency diagnostic trigger is not attributable to the second group of network equipment, determining that the latency associated with the latency diagnostic trigger is attributable to a third group of network equipment, wherein the third group of network equipment comprises third equipment that is not part of the communication network or the content delivery network. For example, the latency analyzer 224 can conclude that the ISP 210 is responsible for the latency when neither the network 220 nor the CDN servers 222, 230 are responsible.

Example operation 914 comprises using the network information to identify the internet service provider. For example, network information gathered at operation 902 can be used to identify the ISP so that the ISP can be notified and/or included in a report summarizing the data gathered by the latency analyzer 224.

Figure 10:
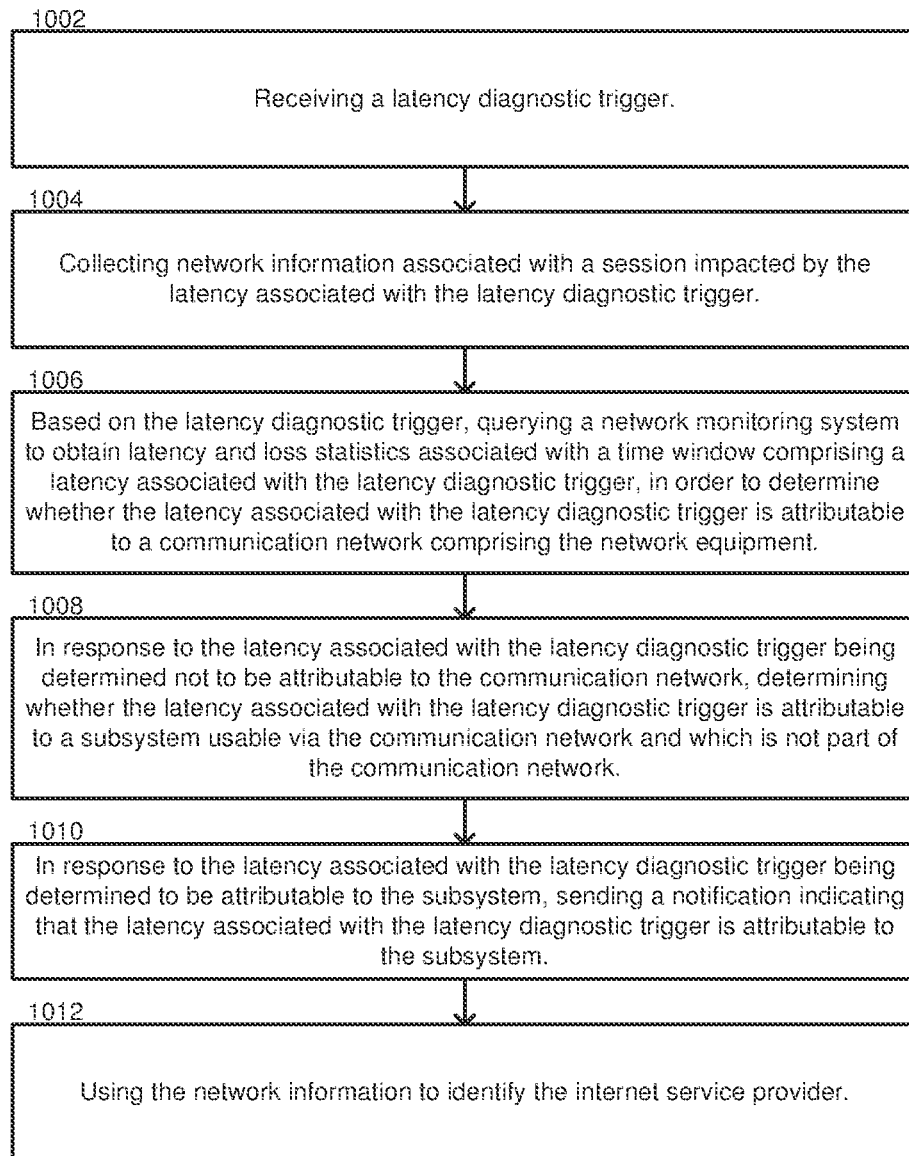
FIG. 10 is a flow diagram representing another group of example operations of network equipment comprising a latency analyzer, in accordance with various aspects and embodiments of the subject disclosure.

FIG. 10 is a flow diagram representing another group of example operations of network equipment comprising a latency analyzer, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 10 can be performed, for example, by network equipment comprising a latency analyzer 224 such as illustrated in FIG. 2. Example operation 1002 comprises receiving a latency diagnostic trigger. The trigger can comprise, e.g., an alert from a video quality monitoring system, a ticket from a customer service module, or some other trigger, as described herein.

Example operation 1004 comprises collecting network information associated with a session impacted by the latency associated with the latency diagnostic trigger. For example, network information pertaining to the session of UE 200 with the communication service provider network(s) 220 can be collected.

Example operation 1006 comprises, based on the latency diagnostic trigger, querying a network monitoring system, e.g., network monitoring system 301 to obtain latency and loss statistics, e.g., 513 associated with a time window comprising a latency associated with the latency diagnostic trigger, in order to determine whether the latency associated with the latency diagnostic trigger is attributable to a communication network, e.g., communication service provider network(s) 220.

Example operation 1008 comprises, in response to the latency associated with the latency diagnostic trigger being determined not to be attributable to the communication network 220, determining whether the latency associated with the latency diagnostic trigger is attributable to a subsystem, such as CDN server 230 or ISP 210, usable via the communication network 220 and which is not part of the communication network 220. For example, both CDN server 230 and ISP 210 are subsystems which are usable via the communication network 220 but not part of the communication network 220. The CDN server 230 can comprise content delivery equipment that is part of a third-party content delivery network. The ISP 210 provides its own third-party equipment which connects to the communication network 220.

Example operation 1010 comprises, in response to the latency associated with the latency diagnostic trigger being determined to be attributable to the subsystem, e.g., 230 or 210, sending a notification, e.g., notification 256, indicating that the latency associated with the latency diagnostic trigger is attributable to the subsystem 230 or 210.

Example operation 1012 comprises using the network information, such as determined at operation 1004, to identify the ISP 210. Since many different ISPs may connect to communication network 220, the network information can be useful for ISP identification.

Figure 11:
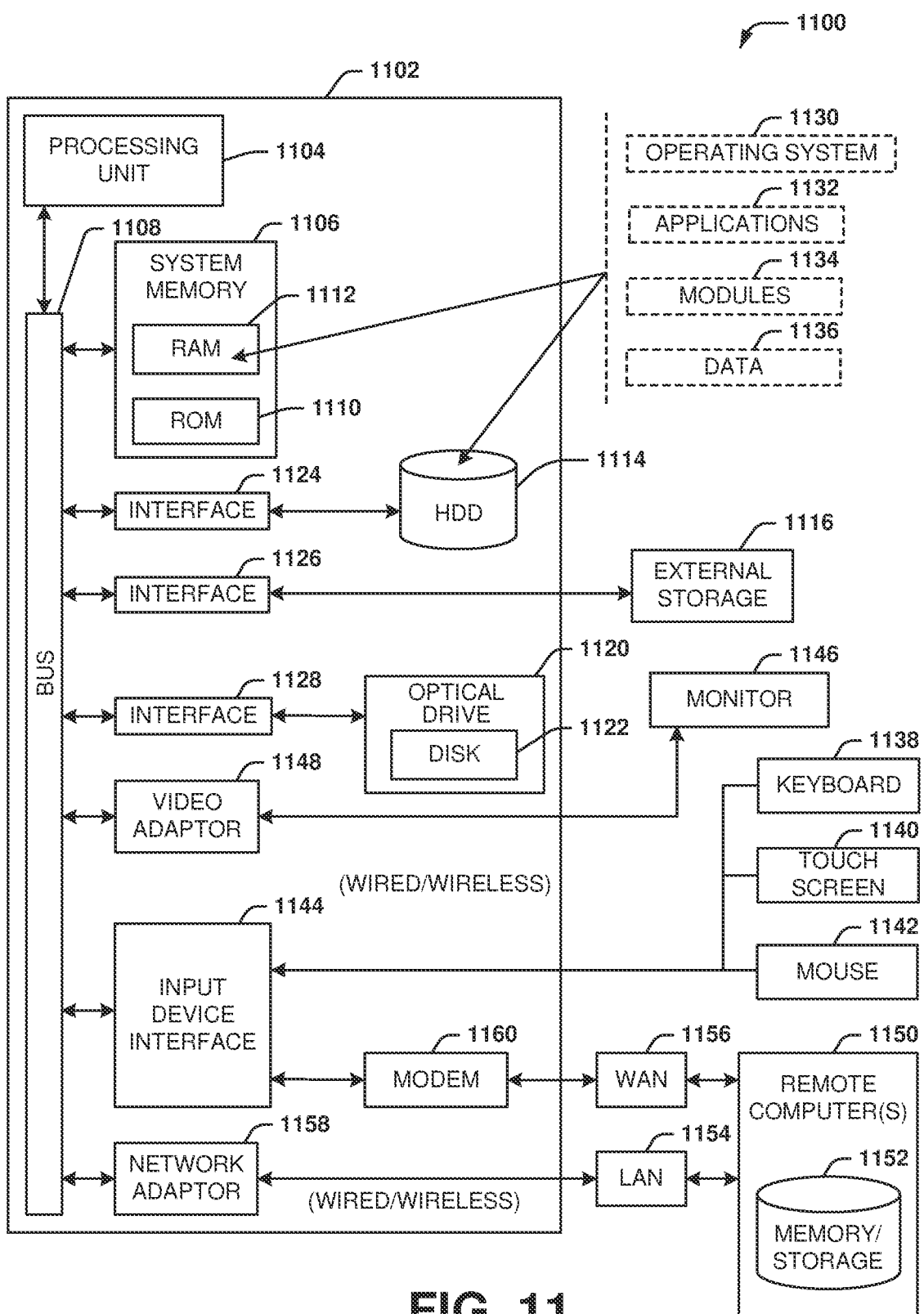
FIG. 11 is a block diagram of an example computer that can be operable to execute processes and methods in accordance with various aspects and embodiments of the subject disclosure.

FIG. 11 is a block diagram of an example computer that can be operable to execute processes and methods in accordance with various aspects and embodiments of the subject disclosure. The example computer can be adapted to implement, for example, any of the various network equipment described herein.

FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-Ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A non-transitory machine-readable medium, comprising executable instructions that, when executed by a processor, facilitate performance of operations, comprising:
   in response to receiving a latency diagnostic trigger generated by a combination of a video quality monitoring alert wherein the latency diagnostic trigger corresponds to an alert associated with a notification from a trouble ticket tracker associated with input from a customer service operation and an automatically generated notification from an anomaly detection process, determining, based on latency and loss statistics associated with a time window comprising the latency diagnostic trigger, whether the latency diagnostic trigger is attributable to a communication network; and
   in response to the latency diagnostic trigger being determined not to be attributable to the communication network, determining whether the latency diagnostic trigger is attributable to a subsystem that is usable via the communication network and that is not part of the communication network;
   in response to the latency diagnostic trigger being determined to be attributable to the subsystem, sending a notification indicating that latency associated with the latency diagnostic trigger is attributable to the subsystem.

2. The method of claim 1, wherein the subsystem comprises content delivery equipment that is part of a content delivery network.

3. The method of claim 1, wherein the subsystem is associated with an internet service provider.

4. The method of claim 3, further comprising:
   collecting, by the network equipment, network information associated with a session impacted by the latency associated with the latency diagnostic trigger; and
   based on the network information, identifying, by the network equipment, the internet service provider.

5. The method of claim 4, wherein the network information comprises at least one of a session identifier or an internet protocol address.

6. The method of claim 1, wherein the latency is associated with communication of video data.

7. The method of claim 6, wherein receiving the latency diagnostic trigger comprises:
   receiving the latency diagnostic trigger via the video quality monitoring system.

8. The method of claim 1, wherein querying the network monitoring system to obtain the latency and loss statistics comprises querying the network monitoring system to obtain a round trip time associated with the latency.

9. The method of claim 1, wherein determining whether the latency is attributable to the subsystem comprises querying a content server access log to determine a cache server processing time.

10. The method of claim 1, wherein determining whether the latency is attributable to the subsystem comprises detecting an increase of a content server cache fill latency.

11. A system, comprising:
    a processor; and
    a memory that stores executable instructions that, when executed by the processor, facilitate performance of operations, comprising:
    in response to receiving a latency diagnostic trigger, obtaining a network communication latency, wherein the latency diagnostic trigger is generated by a combination of a video quality monitoring alert, associated with a notification from a trouble ticket tracker associated with input from a customer service operation and an automatically generated notification from an anomaly detection process; and
    in response to the network communication latency being determined to be attributed to a subsystem that is usable via a communication network and that is not part of the communication network, generating an indication that the network communication latency has been determined to be attributable to the subsystem.

12. The system of claim 11, wherein obtaining the network communication latency comprises:
    querying a network monitoring system to obtain latency and loss statistics associated with a time window comprising the network communication latency.

13. The system of claim 12, wherein querying the network monitoring system to obtain the latency and loss statistics comprises querying the network monitoring system to obtain a round trip time associated with the network communication latency.

14. The system of claim 11, wherein subsystem comprises an internet service provider, and wherein the operations further comprise:
    obtaining network information associated with a session impacted by the network communication latency; and
    based on the network information, identifying the internet service provider.

15. The system of claim 14, wherein the network information comprises at least one of a session identifier or an internet protocol address.

16. The system of claim 14, wherein the operations further comprise:
    sending, to the internet service provider, the indication that the network communication latency has been determined to be attributable to the internet service provider.

17. The system of claim 11, wherein the network communication latency is associated with communication of video data.

18. The system of claim 17, wherein receiving the latency diagnostic trigger comprises:
    receiving the latency diagnostic trigger via a video quality monitoring system.

19. A non-transitory machine-readable medium, comprising executable instructions that, when executed by a processor, facilitate performance of operations, comprising:
- in response to receiving a latency diagnostic trigger generated by a combination of a video quality monitoring alert wherein the latency diagnostic trigger corresponds to an alert associated with a notification from a trouble ticket tracker associated with input from a customer service operation and an automatically generated notification from an anomaly detection process, determining, based on latency and loss statistics associated with a time window comprising the latency diagnostic trigger, whether the latency diagnostic trigger is attributable to a communication network; and one of:
- in response to the latency diagnostic trigger being determined not to be attributable to the communication network, determining whether the latency diagnostic trigger is attributable to a subsystem that is usable via the communication network and that is not part of the communication network; or
- in response to the latency diagnostic trigger being determined to be attributable to the subsystem, sending a notification indicating that latency associated with the latency diagnostic trigger is attributable to the subsystem.

20. The non-transitory machine-readable medium of claim 19, wherein determining whether the latency diagnostic trigger is attributable to the subsystem comprises at least one of querying an access log of a content server to determine a cache server processing time or detecting an increase of a cache fill latency of the content server.

* * * * *

UNITED STATES PATENT AND TRADEMARK OFFICE
CERTIFICATE OF CORRECTION

| | | |
|---|---|---|
| PATENT NO. | : 12,438,793 B2 | Page 1 of 1 |
| APPLICATION NO. | : 18/306931 | |
| DATED | : October 7, 2025 | |
| INVENTOR(S) | : Xiaowen Mang, Carolyn Roche Johnson and Gregory Smith | |

It is certified that error appears in the above-identified patent and that said Letters Patent is hereby corrected as shown below:

In the Claims

Claim 19, Column 25, Line 15, remove "one of"

Claim 19, Column 25, Line 21, remove "or"

Signed and Sealed this
Ninth Day of December, 2025

John A. Squires
*Director of the United States Patent and Trademark Office*